United States Patent
Kobayashi et al.

(10) Patent No.: US 12,202,431 B2
(45) Date of Patent: Jan. 21, 2025

(54) AIRBAG DEVICE AND METHOD FOR MANUFACTURING AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/262,530

(22) PCT Filed: Jan. 19, 2022

(86) PCT No.: PCT/JP2022/001761
§ 371 (c)(1),
(2) Date: Jul. 21, 2023

(87) PCT Pub. No.: WO2022/158483
PCT Pub. Date: Jul. 28, 2022

(65) Prior Publication Data
US 2024/0075899 A1    Mar. 7, 2024

(30) Foreign Application Priority Data
Jan. 25, 2021 (JP) .................... 2021-009788

(51) Int. Cl.
*B60R 21/235* (2006.01)
*B60R 21/217* (2011.01)
(Continued)

(52) U.S. Cl.
CPC .......... *B60R 21/235* (2013.01); *B60R 21/217* (2013.01); *B60R 21/23138* (2013.01);
(Continued)

(58) Field of Classification Search
CPC .......... B60R 21/2171; B60R 21/23138; B60R 2021/23146; B60R 21/237; B60R 21/207;
(Continued)

(56) References Cited

U.S. PATENT DOCUMENTS 5,632,506 A * 5/1997 Shellabarger ....... B60R 21/2171
280/743.1
5,667,241 A * 9/1997 Bunker ................. B60R 21/207
280/730.2

(Continued)

FOREIGN PATENT DOCUMENTS

JP        2000-016222 A    1/2000
JP        2006-088851 A    4/2006
(Continued)

*Primary Examiner* — Paul N Dickson
*Assistant Examiner* — Caitlin Anne Miller
(74) *Attorney, Agent, or Firm* — Harness, Dickey & Pierce, P.L.C.; Stephen T. Olson

(57) ABSTRACT

To prevent outward gas leakage between the airbag cushion and inflator during expansion and deployment with a simple configuration. The present invention provides an airbag device including: an airbag cushion having at least two panels; an inflator that discharges gas inside the airbag cushion; a first piece extending from an edge of a first panel of the two panels that is folded in the middle into the airbag cushion; a second piece provided on a portion near the edge of a second panel facing the first piece inside the airbag cushion and sewn to the folded part of the folded first piece; and an insertion passage for the inflator formed from sewing the folded part and the second piece, and extending from inside the airbag cushion to outside.

15 Claims, 9 Drawing Sheets

(51) Int. Cl.
*B60R 21/231* (2011.01)
*B60R 21/237* (2006.01)

(52) U.S. Cl.
CPC .. *B60R 21/237* (2013.01); *B60R 2021/23146* (2013.01); *B60R 2021/23538* (2013.01); *B60R 2021/23576* (2013.01)

(58) Field of Classification Search
CPC ........... B60R 2021/23576; B60R 2021/23538; B60R 21/231; B60R 2021/23316; B60R 2021/23161
See application file for complete search history.

(56) References Cited

U.S. PATENT DOCUMENTS

| | | | | |
|---|---|---|---|---|
| 5,944,342 | A * | 8/1999 | White, Jr. | ............... B60R 21/23 280/743.1 |
| 6,447,003 | B1 * | 9/2002 | Wallentin | ................ B60R 21/23 280/728.2 |
| 7,195,280 | B2 * | 3/2007 | Wheelwright | ...... B60R 21/2171 280/743.1 |
| 7,396,042 | B2 * | 7/2008 | Mabuchi | ............. B60R 21/2171 280/730.2 |
| 7,963,549 | B2 * | 6/2011 | Schneider | ........... B60R 21/2171 280/730.2 |
| 8,196,952 | B2 * | 6/2012 | Walston | .............. B60R 21/2171 280/730.2 |
| 2005/0110244 | A1 | 5/2005 | Wheelwright | |
| 2021/0138993 | A1 * | 5/2021 | Kobayashi | ........ B60R 21/23138 |

FOREIGN PATENT DOCUMENTS

| | | |
|---|---|---|
| JP | 2011-126497 A | 6/2011 |
| JP | 2011-126499 A | 6/2011 |
| JP | 2014-128997 A | 7/2014 |
| JP | 2019-059337 A | 4/2019 |

* cited by examiner

[FIG. 1]
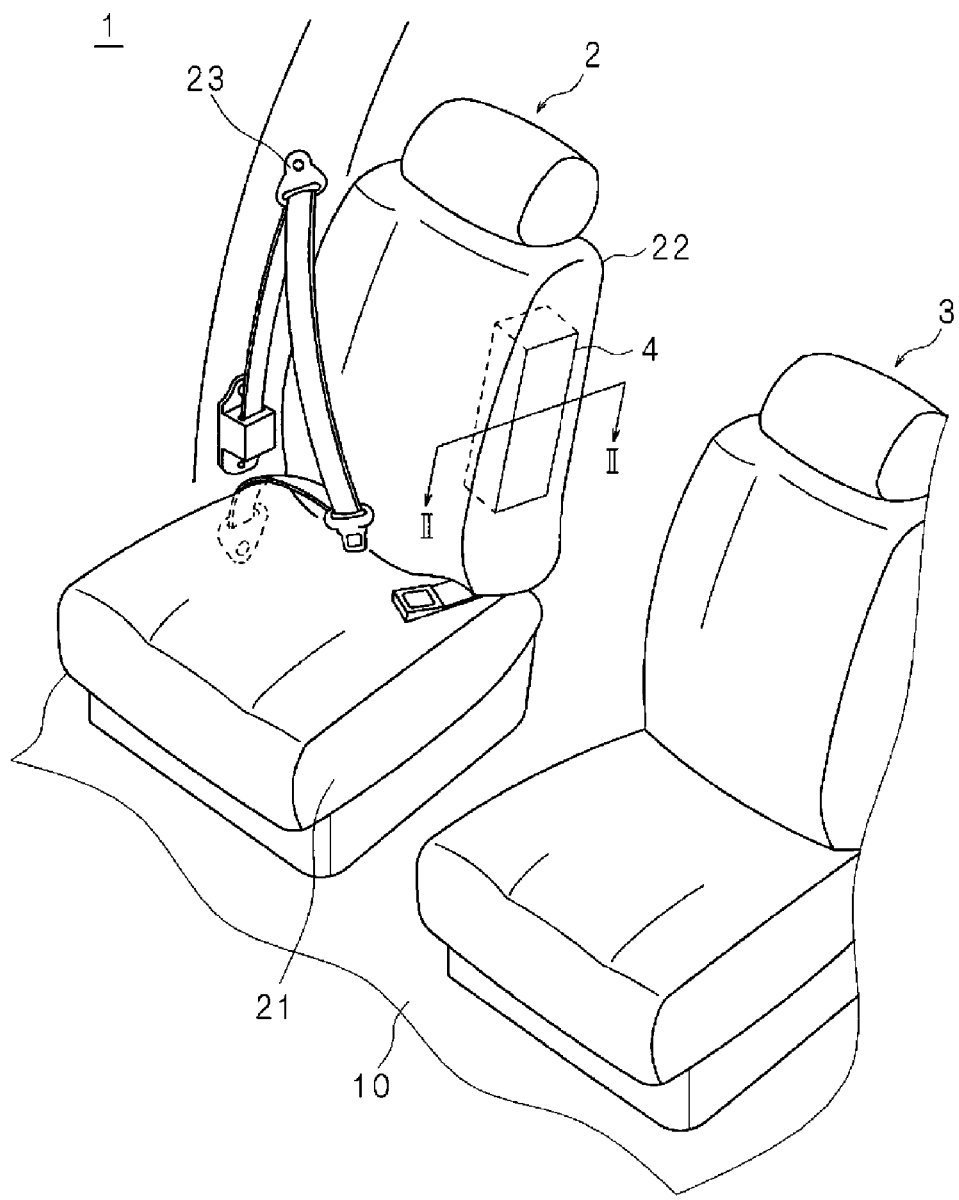

[FIG. 2]
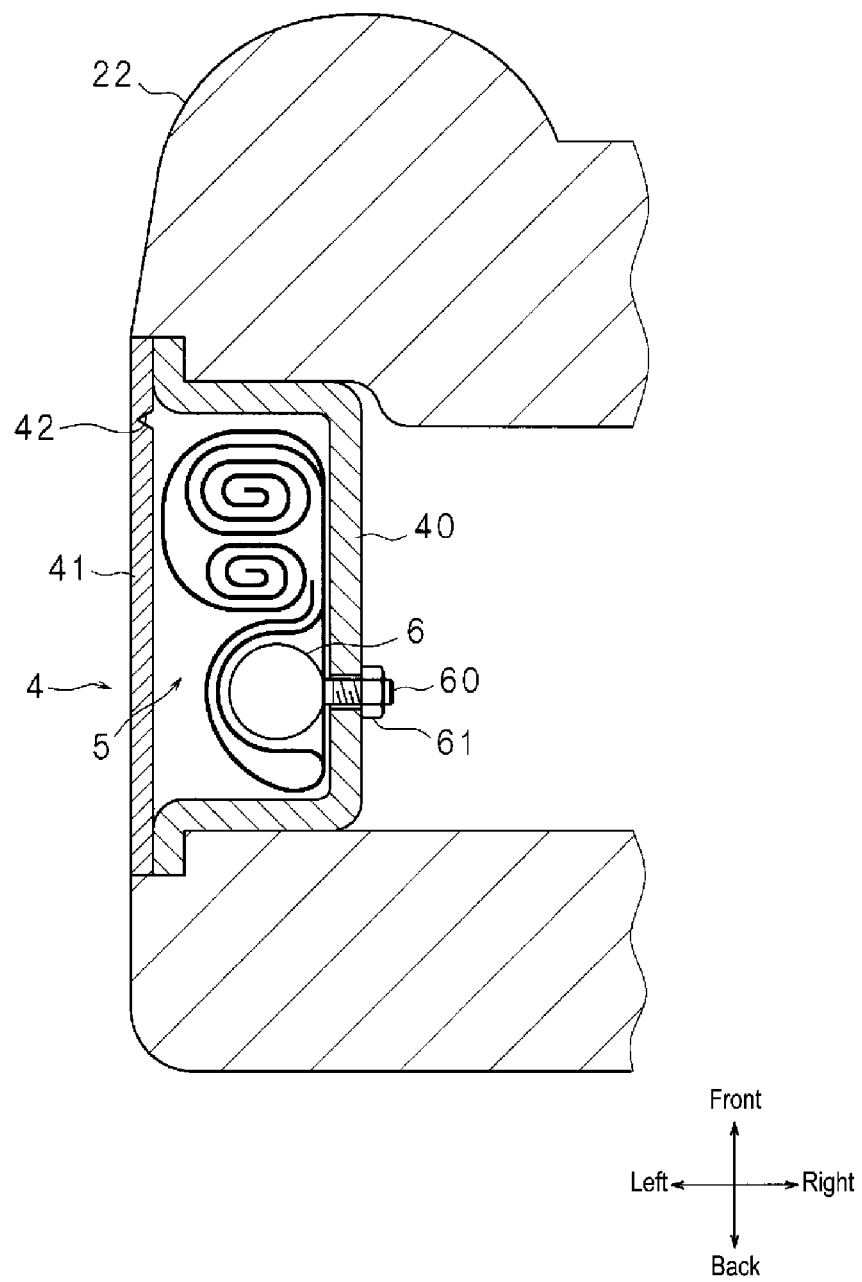

[FIG. 3]
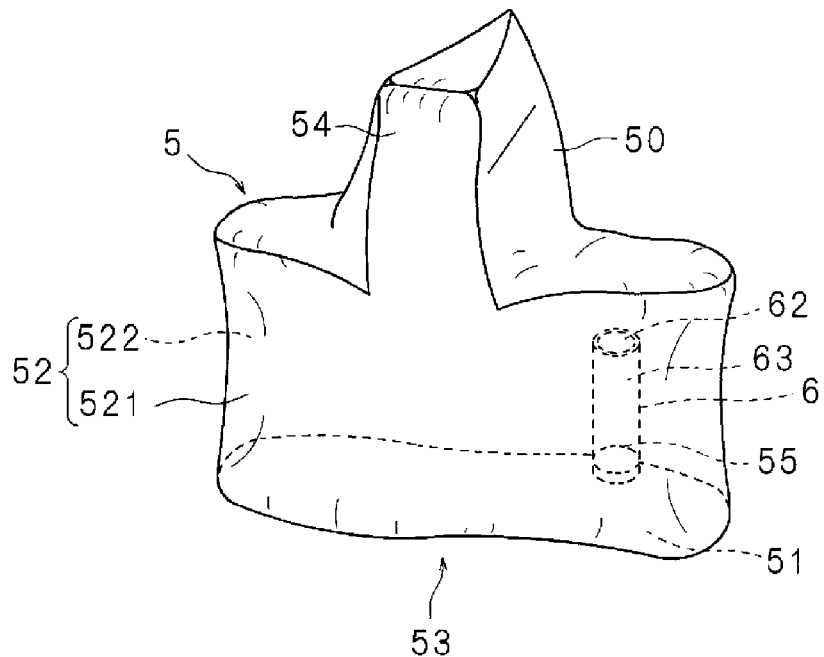
[FIG. 4]
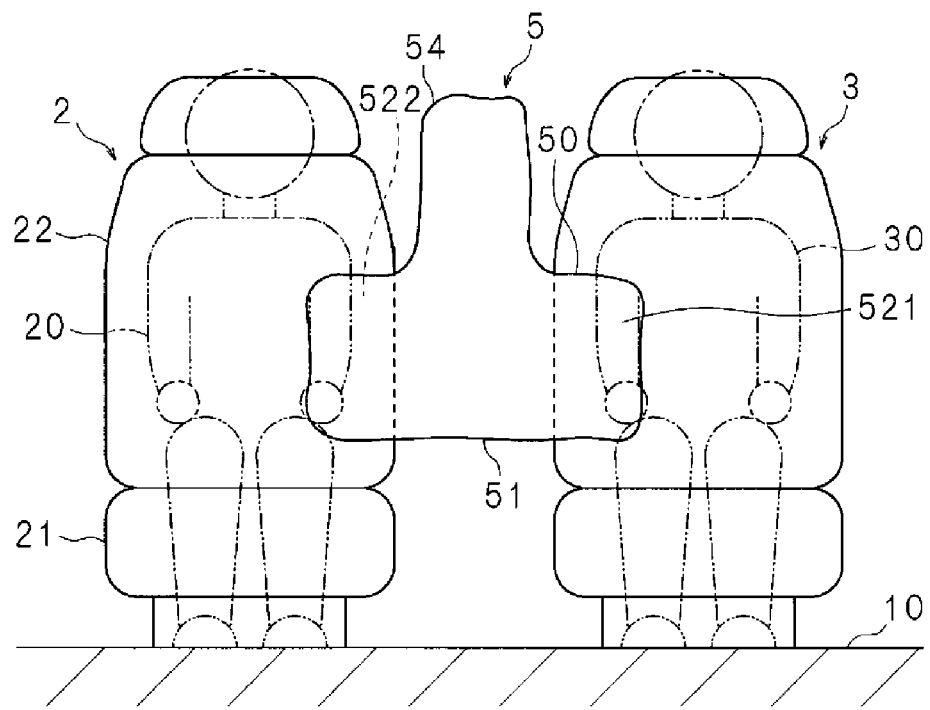

[FIG. 5]
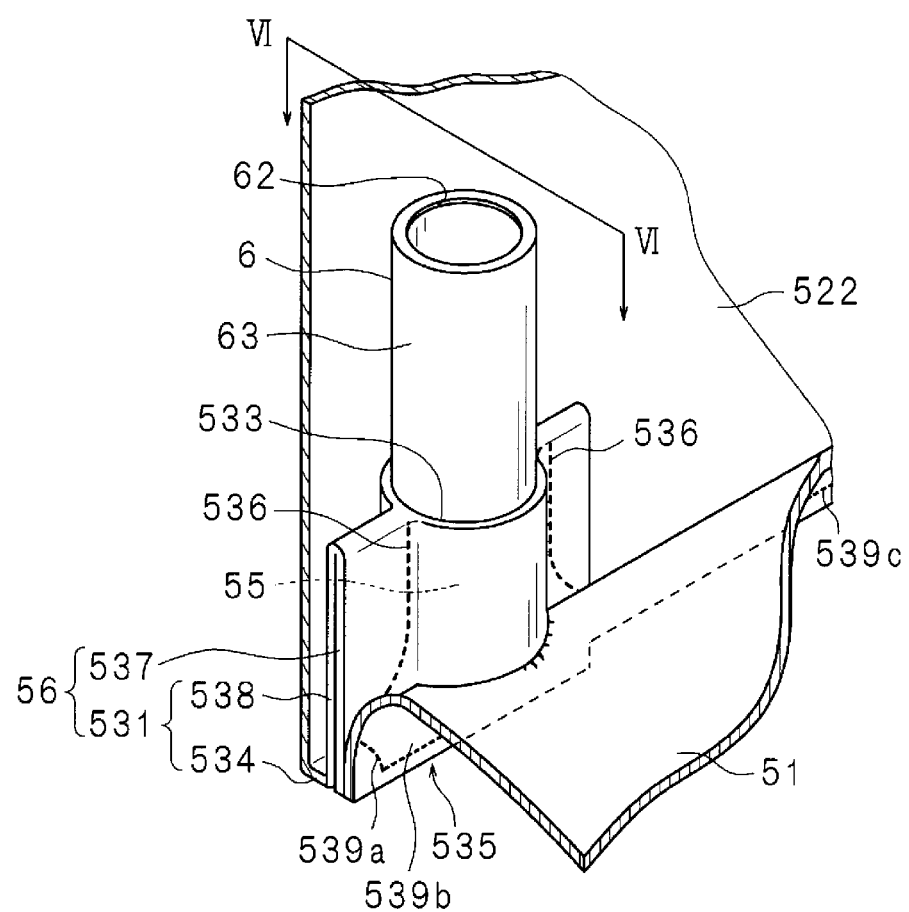

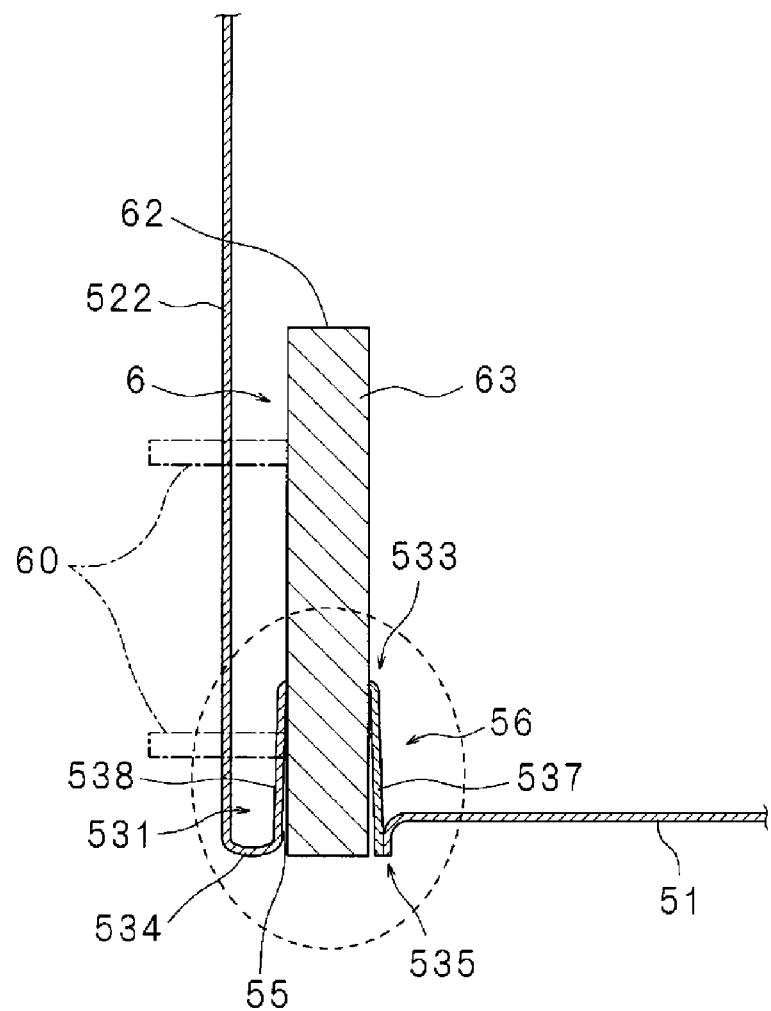
[FIG. 6]

[FIG. 7]
A
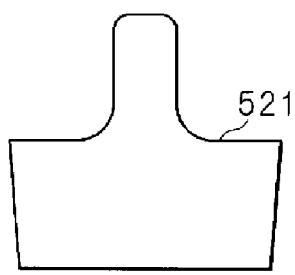
B
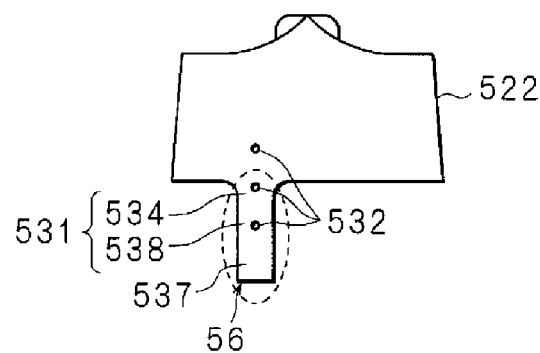
C
D
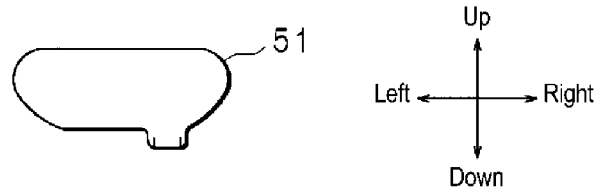

[FIG. 8]
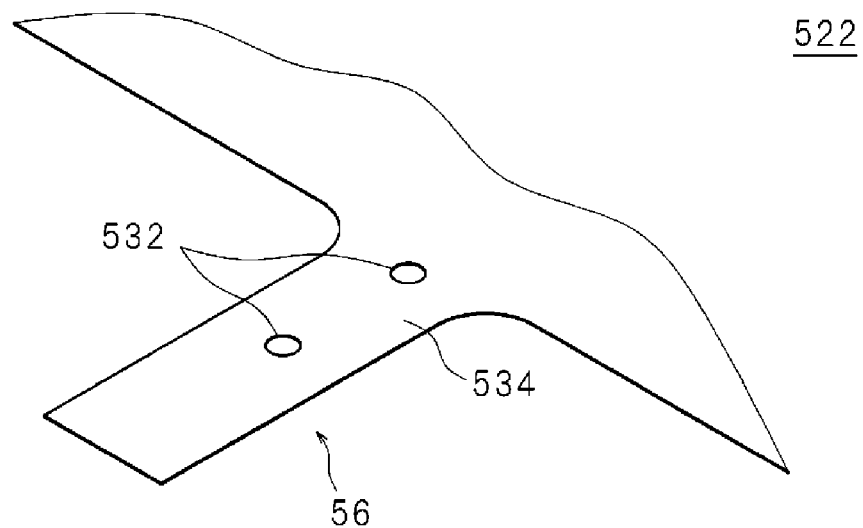
[FIG. 9]
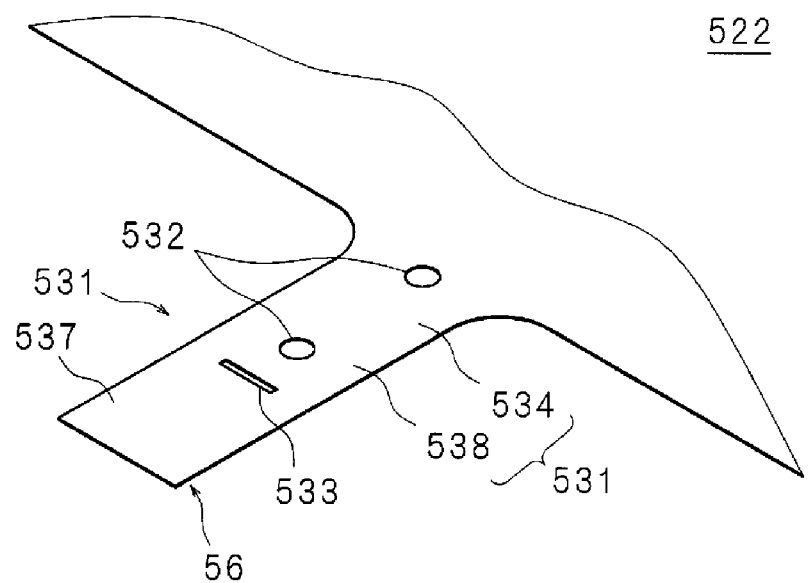

[FIG. 10]
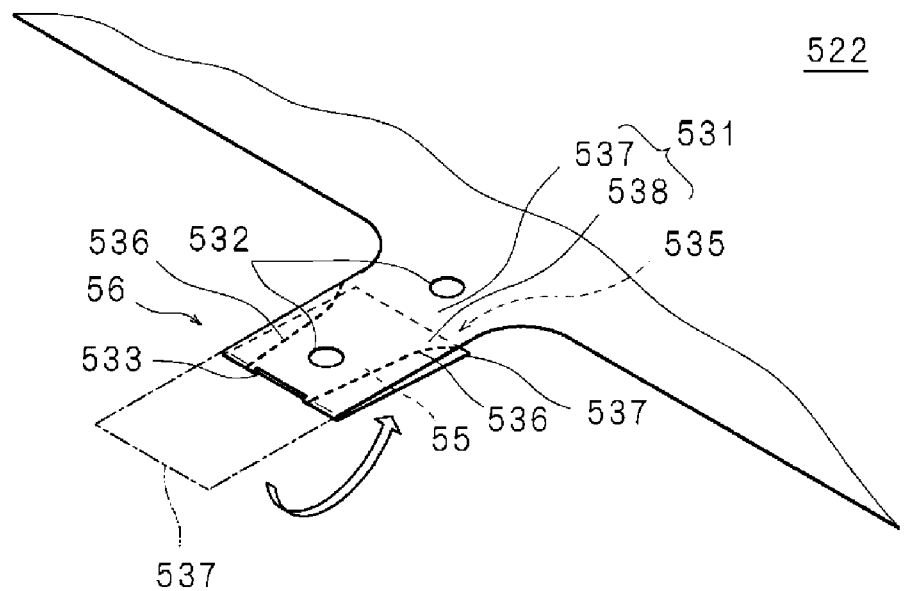
[FIG. 11]
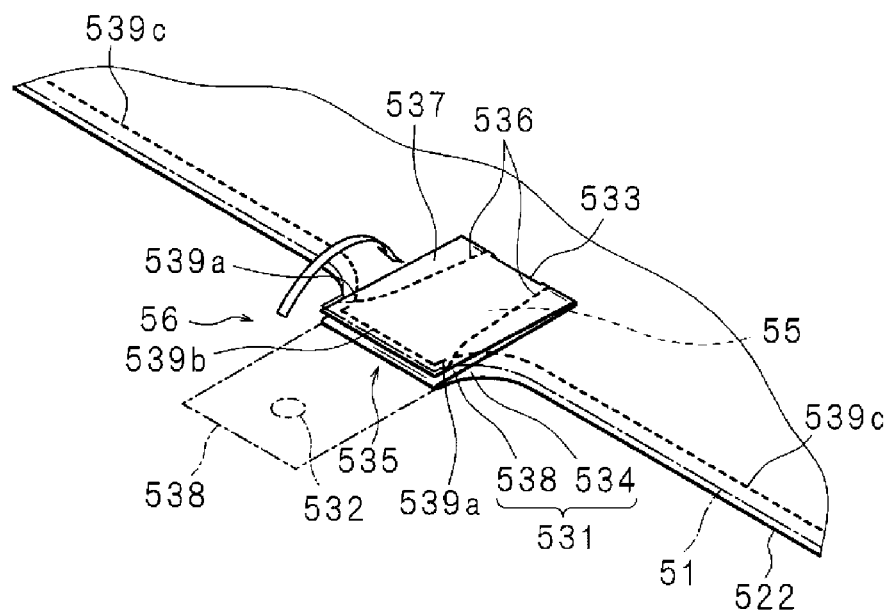

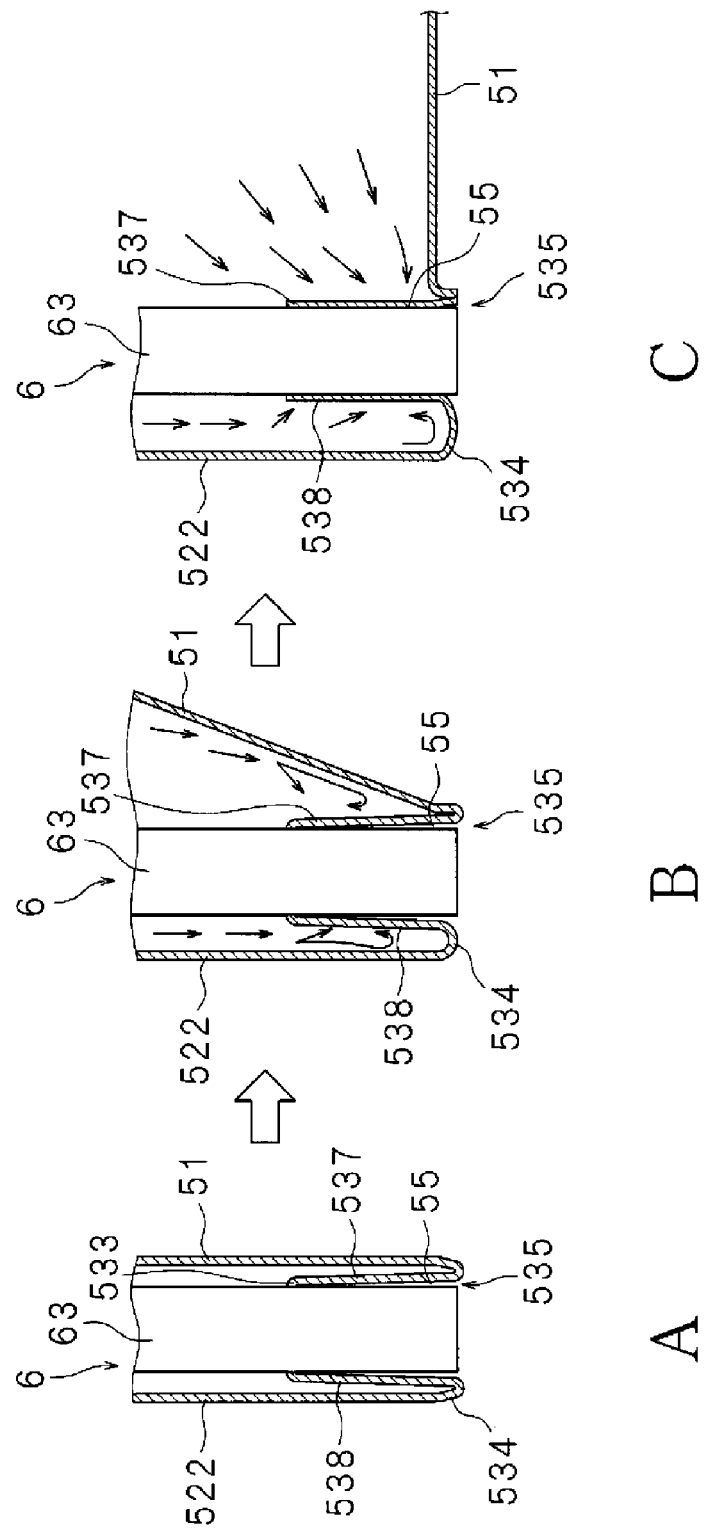
[FIG. 12]

US 12,202,431 B2

AIRBAG DEVICE AND METHOD FOR MANUFACTURING AIRBAG DEVICE

TECHNICAL FIELD

The present invention relates to an airbag device and a method for manufacturing an airbag device.

This application claims priority based on Japanese Application 2021-009788 filed Jan. 25, 2021, which is incorporated by reference in its entirety.

BACKGROUND TECHNOLOGY

Airbag devices have become widely used in recent years. An airbag device is a safety device that activates in an emergency such as a vehicle collision, where the airbag expands and deploys under gas pressure to stop and protect the occupant.

Patent Document 1 discloses a side airbag device provided with a tube that penetrates a bulkhead that demarcates a high pressure chamber and a low pressure chamber, and by providing the inflator in the tube, when gas is discharged from the inflator, the tube expands and gas is supplied to the high pressure chamber and the low pressure chamber and when the high pressure chamber is filled with gas, the tube is closed by the gas pressure in the high pressure chamber, preventing gas from flowing from the high pressure chamber to the low pressure chamber.

PRIOR ART DOCUMENTS

Patent Documents

[Patent Document 1] Japanese Unexamined Patent Application 2011-126497

SUMMARY OF THE INVENTION

Problem to be Solved by the Invention

On the other hand, the airbag device must increase gas pressure in the airbag cushion rapidly during expansion and deployment, and gas leakage from between the airbag cushion and the inflator must be prevented. A method of tightening a metal fitting at the connecting part of the airbag cushion and the inflator is generally used to prevent gas leakage. However, use of this manner of metal fitting increases the number of components, increases the manufacturing cost of the airbag device, and requires a separate process for crimping the metal fitting, causing poor productivity.

However, the side airbag in Patent Document 1 stops flow of gas from the high pressure chamber to the low pressure chamber and is not designed for gas leakage from the airbag cushion to outside. In addition, in the side airbag of Patent Document 1, the tube is enlarged by gas discharge from the inflator and gas is supplied so with the tube enlarged, gas flows from both ends of the tube making it impossible to rapidly increase gas pressure inside the airbag cushion during expansion and deployment.

In light of these circumstances, an object of the present invention is to provide an airbag device and method for manufacturing an airbag device that prevents gas leakage from between the airbag cushion and the inflator to outside during expansion and deployment using a simple configuration and without requiring a separate member.

Means for Solving the Problems

An airbag device according to the present invention includes:
an airbag cushion including at least two panels;
an inflator that discharges gas inside the airbag cushion;
a first piece (531) having a base part (534) extending from an edge of a first panel (52) and a folded part (538) that is folded inside the airbag cushion (5) from the tip of the base part (534);
a second piece (537) arranged opposite the folded part (538), connected to an edge of a second panel (51), and sewn to the folded part (538); and
an insertion passage (55) for the inflator (6) formed from the sewing of the folded part (538) and the second piece (537) extending from inside the airbag cushion (5) towards the outside.

A method of manufacturing an airbag device according to the present invention provided with an airbag cushion including at least two panels and an inflator for blowing gas inside the airbag cushion, includes:
overlapping a first piece extending from an edge of a first panel of the two panels with a second piece positioned at a distance from a base part of the first piece;
forming an insertion passage for the inflator along the extension direction of the first piece by sewing a first sewing at two isolated locations in a direction that intersects with this extension direction, which sews together the second piece and a portion of the first piece corresponding to the second piece;
folding the corresponding portion of the first piece so as to face the base part;
sewing a second sewing that sews together the first panel, the corresponding portion, the second piece, and a second panel; and
inserting the inflator through the outer opening of the insertion passage open to the outside of the airbag cushion into the airbag cushion.

Effect of the Invention

With the present invention, external leakage from between the airbag cushion and the inflator during expansion and deployment can be prevented with a simple configuration without using a separate member.

BRIEF DESCRIPTION OF THE DRAWINGS

FIG. 1 is a perspective view schematically depicting the interior of a passenger compartment in which the airbag device according to the embodiment is installed.

FIG. 2 is a cross section view of the airbag device along line II-II in FIG. 1.

FIG. 3 is a perspective view of the airbag cushion.

FIG. 4 is a front view depicting the deployed state of the airbag cushion in the passenger compartment as seen from the front.

FIG. 5 is an enlarged view of a portion depicting the area near the insertion passage of the airbag cushion.

FIG. 6 is a vertical cross section view along the line VI-VI in FIG. 5.

FIG. 7 is an explanatory diagram for describing a configuration of the airbag cushion.

FIG. 8 is an explanatory diagram for describing the manufacturing procedure of an airbag device according to the embodiment.

FIG. 9 is an explanatory diagram for describing the manufacturing procedure of an airbag device according to the embodiment.

FIG. 10 is an explanatory diagram for describing the manufacturing procedure of an airbag device according to the embodiment.

FIG. 11 is an explanatory diagram for describing the manufacturing procedure of an airbag device according to the embodiment.

FIG. 12 is a partial cross section view for schematically describing the expansion process of the airbag cushion during expansion and deployment.

EMBODIMENTS OF THE INVENTION

The airbag device according to the embodiment of the present disclosure will be described in detail according to the drawings below. The airbag device according to the embodiment of the present invention is equipped to a seat of a vehicle.

The "vertical direction" of the vehicle referred to in the descriptions below indicates a direction on a line connecting the center of the roof of the vehicle to the center of the floor of the vehicle, where the direction toward the roof is "upper" and the direction toward the floor is "lower". Additionally, the "front-to-back direction" refers to the direction in which the vehicle travels, where the advancing direction is the "front direction" and the reverse direction is the "back direction". Furthermore, the "vehicle width direction" is the direction orthogonal to the "front-to-back direction" described above, and is the direction in which the regular seats are arranged in a line in the passenger compartment.

FIG. 1 is a perspective view schematically illustrating the interior of a passenger compartment 1 in which the airbag device 4 according to the embodiment is installed. FIG. 1 depicts a driver seat 2 and a passenger seat 3 installed on a floor 10 of a passenger compartment 1, as well as a seatbelt 23 equipped in the driver seat 2. The driver seat 2 includes a seat portion 21 and a backrest 22 that rises upward from the rear side of the seat portion 21, and an occupant 20 (see FIG. 4) is seated on the seat part 21 with the seatbelt 23 buckled in.

The airbag device 4 according to the embodiment is incorporated into the side of the passenger seat 3 side of the backrest 22 of the driver seat 2. FIG. 2 is a cross section view of the airbag device 4 along line II-II in FIG. 1. The vertical direction in this drawing corresponds to the "front-to-back direction" described above.

The airbag device 4 includes an airbag cushion 5 and an inflator 6 that are stowed in the stowage part 40. The stowage part 40 is a box body provided with an outward opening on the side surface of the passenger seat 3 side (left side in FIG. 2) of the backrest 22, and is configured, for example, using a portion of the backrest 22 skeleton frame. The opening of the stowage part 40 is covered by a cover plate 41 which is flush with the side surface of the backrest 22. The cover plate 41 is a resin plate of lower strength than the stowage part 40, and a cleavage groove 42 is formed on the inner surface of the front portion (upper portion in FIG. 2) of the cover plate 41 extending in the vertical direction.

The airbag cushion 5 is, for example, a bag body made of cloth reinforced by weaving in high-strength fibers such as nylon fiber or the like, and stowed inside the stowage part 40 in a folded state. The inflator 6 is cylindrical in shape and is mounted inside the airbag cushion 5. A stud bolt 60 protruding radially outward is mounted on the circumferential surface of the inflator 6 and this stud bolt 60 passes through a stud hole 532 (see FIG. 7) and extends outside the airbag cushion 5.

The inflator 6 is secured by tightening a nut 61 onto the stud bolt 60 passed through the bottom plate of the stowage part 40, and the airbag cushion 5 is secured by being sandwiched between the inflator 6 and the bottom plate of the stowage part 40 at the stowage position of the inflator.

The inflator 6 is activated in the event of an emergency such as a vehicle collision and the like and injects gas for expansion and deployment into the airbag cushion 5. The airbag cushion 5 expands explosively under the action of the injected gas of the inflator 6, ruptures the cover plate 41 at the position of the cleavage groove 42, and expands outwardly as a support for the stowage part 40.

FIG. 3 is a perspective view of the airbag cushion 5 depicting the form thereof during expansion and deployment. As depicted in FIG. 3, the airbag cushion 5 includes a main deployment part 53 and a protruding part 54 that protrudes upwards from the center part of the upper surface of the main deployment part 53. In other words, the airbag cushion 5 is composed of an upper surface panel 50, an opposing lower surface panel 51 separated in the vertical direction, and a cylindrical shaped side surface panel 52 (first panel) that connects the periphery of the upper surface panel 50 and the lower surface panel 51 (second panel, bottom surface panel).

The side surface panel 52 is composed of a front side surface panel 521 and a rear side surface panel 522 separated and opposed in the front-to-back direction. The front side surface panel 521 is arranged more forward than the rear side surface panel 522. The edges of the front side surface panel 521 and the rear side surface panel 522 are sewn together, forming a cylindrical shape.

The upper surface panel 50, lower surface panel 51, and side surface panel 52 are integrally joined by having their respective edges sewn together and as depicted in the figures, constitute the main deployment part 53 that deploys as a rectangular body elongated in the left-right direction (vehicle width direction). The protruding part 54 rises upward at the center in the length direction of the upper surface panel 50, and deploys with an appropriate width in the left-right direction.

As depicted by a dashed line in the figures, the inflator 6 is stowed along the inner surface of the rear side surface panel 522 with the axial direction set to the vertical direction. Two stud bolts 60 used for the aforementioned securing are provided on the inflator 6 separated in the vertical direction and each protrude through stud holes 532 to the outside of the rear side surface panel 522.

FIG. 4 is a front view depicting the deployed state of the airbag cushion 5 in the passenger compartment 1 as seen from the front. As described above, the airbag cushion 5 is stowed in the side part of the backrest 22 of the driver seat 2, and in the event of an emergency such as a vehicle collision or the like, expands under the action of the gas injected by the inflator 6 and deploys between the driver seat 2 and the passenger seat 3 which are adjacent to each other in the vehicle width direction.

The main deployment part 53 composed of the upper surface panel 50, the lower surface panel 51, and the side surface panel 52 extends laterally at a height position corresponding to the waist and shoulder of the occupant 20 seated in the driver seat 2 and the occupant 30 seated in the passenger seat 3, and restrains the occupants 20 and 30 from the side on both sides reaching the front position of the driver seat 2 and the passenger seat 3. Accordingly, lateral movement of the occupants 20 and 30 during a side collision can be prevented and the occupants 20 and 30 can be effectively protected. Note that the occupants 20 and 30 in FIG. 4 are schematically illustrated by a two-dot chain line.

The protruding part 54 rises upward in the center of the main deployment part 53 and reaches a height position corresponding to the heads of the occupant 20 seated in the driver seat 2 and the occupant 30 seated in the passenger seat 3. Therefore, even if, for example, the occupant 30 sitting in the passenger seat 3 is OOP (Out of Position), the head of the occupant 30 moving laterally towards the driver seat 2 can be restrained by the protruding part 54.

An insertion passage 55 is formed at the seam of the rear side surface panel 522 and lower surface panel 51 enabling insertion of the inflator 6 into the airbag cushion 5. FIG. 5 is an enlarged diagram depicting the part of the airbag cushion 5 near the insertion passage 55 and FIG. 6 is a vertical cross section view along the line VI-VI of FIG. 5. For convenience, the stud holes 532 are omitted in FIG. 6 and the stud bolts 60 are depicted as virtual lines (alternate long and short dashed line).

The insertion passage 55 includes a first piece 531 provided on the rear side surface panel 522 extending from a part of the edge of the lower surface panel 51 and, midway, folded inside the airbag cushion 5, and opposite the first piece 531, a second piece 537 provided on the lower surface panel 51, and extending from the edge of the rear side surface panel 522 to the inside of the airbag cushion 5. The first piece 531 has an elongated rectangular shape. The second piece 537 has a rectangular shape with the dimension in the longitudinal direction shorter than that of the first piece 531 and the dimension in the width direction substantially equal to that of the first piece 531. A folded part 538 (corresponding part) of the first piece 531, folded inside the airbag cushion 5 has a size substantially equal to the second piece 537. The folded part 538 and the second piece 537 are positioned opposite each other.

The first piece 531 is integrally formed with the rear side surface panel 522 and includes a base part 534 and the folded part 538. Furthermore, the first piece 531 and second piece 537 are integrally formed. The second piece 537 is connected to the tip of the first piece 531. In other words, on the rear side surface panel 522, an extension piece 56 extends from a part of the edge of the lower surface panel 51 and the extension piece 56 includes the first piece 531 and the second piece 537 (see FIG. 7 and FIG. 8).

In addition, a through hole 533 (internal opening) that is for example slit shaped, is formed at the border of the first piece 531 and the second piece 537, in other words, penetrating in the thickness direction between the folded part 538 and the second piece 537. The folded part 538 and the second piece 537 are separated using the through hole 533 as a reference. The length of the edge of the through hole 533 is substantially equal to the length of the outer periphery of a main body part 63 of the inflator 6, described below.

In other words, the extension piece 56 is first folded towards the inside of the airbag cushion 5 at a position slightly separated from the base part 534 and then folded again at the through hole 533 causing the folded part 538 and the second piece 537 to face each other. The end part of the extension piece 56 (second piece 537) is sewn to the lower surface panel 51, as described below.

A first seam 536 sewing the folded part 538 and second piece 537 together is formed in the extension direction of the first piece 531, in other words, along the longitudinal direction of the folded part 538 or second piece 537. The first seams 536 are formed, separated in the width direction of the folded part 538 or second piece 537, along the edges of both long sides of the folded part 538 and second piece 537.

Thus, the insertion passage 55, composed of the folded part 538 and second piece 537, is formed extending in the longitudinal direction of the folded part 538 or second piece 537, in other words, from inside to outside the airbag cushion 5. With the insertion passage 55, the through hole 533 is opened at a first end, inside the airbag cushion 5, and an outer opening 535 is opened at a second end, outside the airbag cushion 5.

In the insertion passage 55, the spacing between the first seams 536 gradually increases moving away from the through hole 533. Therefore, the outer opening 535 is larger than the through hole 533.

The inflator 6 has a cylindrically shaped main body part 63 and a gas discharge outlet 62 for injecting gas for expansion and deployment is provided at a first end of the main body part 63. The first end of the main body part 63 of the inflator 6 is inserted into the insertion passage 55; thus, the gas discharge outlet 62 of said first end is arranged inside the airbag cushion 5 separated from the through hole 533, while a second end is arranged near the outer opening 535.

As described above, the spacing between the first seams 536 gradually increases while moving away from the through hole 533 so the spacing between the circumferential surface of the main body part 63 and the second piece 537 or the folded part 538 also gradually increases while moving away from the through hole 533.

Second seams 539a, 539b, and 539c that sew together the edge parts of the lower surface panel 51 are formed on the edge part of the lower surface panel 51 of the rear side surface panel 522 excluding the first piece 531 portion (hereinafter, abbreviated to edge excluding the first piece 531), and the edge part of the short side of the second piece 537.

In detail, the second seam 539a formed in an arc at both corners of the edge part of the second piece 537 sews together the lower surface panel 51, the second piece 537, the folded part 538, and the base part 534. In addition, the second seam 539b formed along the end part of the short side of the second piece 537 sews together only the second piece 537 and the lower surface panel 51. Furthermore, the second seam 539c formed along the edge of the rear side surface panel 522 excluding the first piece 531 sews together the rear side surface panel 522 and the lower surface panel 51. In particular, the second seam 539a is formed so as to intersect the first seams 536. The second seam 539a overlaps with the first seams 536, enabling preventing of gas leakage.

FIG. 7 is an explanatory diagram for describing the configuration of the airbag cushion 5. For convenience, the upper surface panel 50, lower surface panel 51, front side surface panel 521, and rear side surface panel 522, prior to being sewn together, are depicted in simplified form in FIG. 7. In addition, the "up, down" and "left, right" in the figure are used in the description below.

FIG. 7A depicts the front side surface panel 521 and the front side surface panel 521 includes a rectangular portion constituting the main deployment part 53 and a narrow rectangular shape extending upward from a center part of a long side of the rectangular portion that constitutes the protruding part 54.

FIG. 7B depicts the rear side surface panel 522 and the rear side surface panel 522 includes a rectangular portion that constitutes the main deployment part 53. A rectangle portion is provided on an upper long side of the rectangular portion extending upwards from a center part and the long narrow rectangular shape extension piece 56 is provided extending downward from near the left end part of a lower long side of the rectangular portion. One stud hole 532 is formed in the rectangular portion and two stud holes 532 are formed in the extension piece 56.

FIG. 7C depicts the upper surface panel 50 having a left-right symmetrical shape and the upper edge of the front side surface panel 521 is sewn to the edge of the upper recession and ridge shape thereof and the upper edge of the rear side surface panel 522 is sewn to the lower edge thereof.

FIG. 7D depicts the lower surface panel 51 which has a roughly inverted trapezoidal shape. The front side surface panel 521 is sewn to the long edge of the two parallel sides of the lower surface panel 51 and the rear side surface panel 522 is sewn to the edge of the short side.

In the present embodiment, a case of configuring the airbag cushion 5 in a bag shape by sewing together the upper surface panel 50, lower surface panel 51, front side surface panel 521, and rear side surface panel 522 is described, but is not limited to this case. For example, an arbitrary joining technique such as adhesion or welding can be used.

FIG. 8 to FIG. 11 are explanatory diagrams for describing the manufacturing procedure of the airbag device 4 according to the embodiment. In addition, FIG. 8 to FIG. 11 only depict the portions enclosed in dashed lines in FIG. 7. The manufacturing method of the airbag device 4 according to the present Embodiment is described according to FIG. 8 to FIG. 11.

First, the operator prepares the rear side surface panel 522 depicted in FIG. 7B. As depicted in FIG. 8, a narrow rectangular shaped extension piece 56 is provided on the rear side surface panel 522 extending from a portion of an edge of a long side. Stud holes 532 are formed in the center part of the extension piece 56 and in the base part 534.

An operator forms a through hole 533 (see FIG. 9) in a slit shape in the extension direction, in other words, the longitudinal direction in the center part of the extension piece 56. The through hole 533 extends in the width direction of the extension piece 56. The extension piece 56 is divided into the first piece 531 on the base part 534 side and the second piece 537 on the tip end side at the through hole 533 reference. In other words, the through hole 533 is formed at the border of the first piece 531 and the second piece 537.

Next, as in FIG. 10, the operator folds the second piece 537 onto the base part 534 so that the folded part 538 is on top with the through hole 533 position as a fold line (see the white arrow in FIG. 10). This causes the second piece 537 to overlap with the folded part 538 at a position separated from the base part 534. The folded part 538 corresponds to the second piece 537. In FIG. 10, the second piece 537 prior to folding is depicted using an alternate long and short dashed line.

Here, a first sewing process, sewing the folded part 538 and second piece 537 together is performed in the extension direction of the first piece 531, in other words, along the longitudinal direction of the folded part 538 or second piece 537. The first sewing is performed, separated in the width direction of the folded part 538 or second piece 537, along the edges of both long sides of the folded part 538 and second piece 537. Therefore, as in FIG. 10, the first sewing forms two first seams 536. The first sewing is performed so that the spacing between the first seams 536 becomes gradually larger moving from the through hole 533 to the base part 534.

With this manner of first sewing, the insertion passage 55 is formed extending in the longitudinal direction of the folded part 538 or second piece 537. At the current point, the through hole 533 is open at the first end of the insertion passage 55 and the second end of the insertion passage 55 is open to the base part 534. This open end becomes the outer opening 535 already described. As described above, the outer opening 535 is larger than the through hole 533.

Next, as depicted in FIG. 11, with the second piece 537 as-is in the overlapping state, the operator folds the folded part 538 so as to face the base part 534 (see the white arrow in FIG. 11). In FIG. 11, the folded part 538 prior to folding is depicted with a two-dot chain line. Here, the two stud holes 532 overlap, the folded part 538 overlaps on the base part 534, and the second piece 537 overlaps on the folded part 538.

In this state, the operator places the lower surface panel 51 on the second piece 537 and performs the second sewing process, sewing the rear side surface panel 522, folded part 538, second piece 537, and lower surface panel 51. In FIG. 11, the lower surface panel 51 is depicted using an alternate long and short dashed line. The second seams 539a, 539b, and 539c are formed in the second sewing.

In other words, the second seam 539a that sews together the lower surface panel 51, the second piece 537, the folded part 538, and the base part 534, are formed in an arc at both corners of the edge of the second piece 537. In addition, the second seam 539b that only sews together the second piece 537 and the lower surface panel 51 is formed along the end part of the short side of the second piece 537. In addition, the second seam 539c that sews together the rear side surface panel 522 and the lower surface panel 51 is formed along the edge part of the rear side surface panel 522 excluding the base part 534. As described above, the second seam 539a is formed so as to intersect with the first seams 536.

Thereafter, the operator sews the edge of the first long side of the front side surface panel 521 to the edge of the lower surface panel 51. In addition, the operator sews both short side edges of the rectangular portion of the front side surface panel 521 to both short side edges of the rectangular portion of the rear side surface panel 522 to configure the cylindrical shaped side surface panel 52. Furthermore, the operator sews the upper surface panel 50 to the edge of the second long side of the front side surface panel 521 and the edge of the second long side of the rear side surface panel 522

The airbag cushion 5 is formed by means of the work described above.

Next, the operator inserts the inflator 6 into the insertion passage 55 of the airbag cushion 5. The first end of the main body part 63 of the inflator 6 is inserted into the insertion passage 55 through the outer opening 535. The first end of the main body part 63 passes through the insertion passage 55 and protrudes from the through hole 533 into the airbag cushion 5. The gas discharge outlet 62 at the first end of the main body part 63 is arranged separated from the through hole 533 and the second end is arranged near the outer opening 535.

On the other hand, gas pressure in the airbag cushion 5 must be increased rapidly during expansion and deployment and gas leakage from between the airbag cushion 5 and the inflator 6 (main body part 63) must be prevented. A method of attaching a metal fitting such as a so-called steel band in the insertion part of the inflator 6 of the airbag cushion 5 is generally used to prevent gas leakage. However, use of this manner of metal fitting increases the number of components, increases the manufacturing cost of the airbag device, and requires a separate process for crimping the metal fitting, causing poor productivity.

The airbag device 4 according to the embodiment is configured to enable resolving this type of problem. This is described in detail below.

FIG. 12 is a partial cross section view for schematically describing the expansion process of the airbag cushion 5 during expansion and deployment. FIG. 12 depicts the portion in FIG. 6 enclosed with a dashed line. In addition, FIG. 12A depicts the state just prior to expansion and deployment of the airbag cushion 5, FIG. 12B depicts the state part way through expansion and deployment of the airbag cushion 5, and FIG. 12C depicts the state with expansion and deployment of the airbag cushion 5 complete.

As described above, the inflator 6 is inserted into the insertion passage 55 of the airbag cushion 5 and with the insertion passage 55, the outer opening 535 is larger than the through hole 533 where the spacing between the inner surface of the insertion passage 55 and the main body part 63 of the inflator 6 gradually increases approaching the outer opening 535 from the through hole 533. In other words, the insertion passage 55 has a conical shape with the diameter reducing from the outside of the airbag cushion 5 inwards.

This type of spacing between the inner surface of the insertion passage 55 and the main body part 63 of the inflator 6 is maintained prior to expansion and deployment of the airbag cushion 5 where the lower surface panel 51 faces the rear side surface panel 522 and the inflator 6 is interposed between the lower surface panel 51 and the rear side surface panel 522 (see FIG. 12A).

Expansion and deployment of the airbag cushion 5 starts when the inflator 6 starts to inject gas. As described above, the gas discharge outlet 62 of the inflator 6 is separated from the through hole 533 so the discharge direction of the gas from the gas discharge outlet 62 will not be directed towards the through hole 533. In other words, gas discharge will not enlarge the through hole 533.

As depicted in FIG. 12B, the discharged gas rapidly moves along the inner surface of the airbag cushion 5. In other words, gas pressure is applied to the insertion passage 55 starting from the outer surface of the outer opening 535. Also, the insertion passage 55 has a conical shape with the diameter thereof reduced from the outside toward the inside of the airbag cushion 5 so as in FIG. 12B, gas flow is guided through the outer surface of the insertion passage 55 from the outer opening 535 toward the through hole 533. Here, the gas applies pressure on the inflator 6 from all radial directions.

As described above, the insertion passage 55 is configured by overlapping and sewing of the folded part 538 and the second piece 537 and the inflator 6 is interposed between the folded part 538 and the second piece 537. Therefore, gas pressure applied on the insertion passage 55 is applied in the direction of bringing the folded part 538 and the second piece 537 closer together. Therefore, the spacing between the folded part 538 and the second piece 537, in other words, the inner surface of the insertion passage 55 and the inflator 6, becomes narrower.

As gas pressure inside the airbag cushion 5 increases, the spacing between the inner surface of the insertion passage 55 and the inflator 6 becomes narrower and the spacing between the lower surface panel 51 and the rear side surface panel 522 widens. When expansion and deployment of the airbag cushion 5 is complete, the spacing between the inner surface of the insertion passage 55 and the inflator 6 is eliminated, closing the insertion passage 55 and the spacing between the lower surface panel 51 and the rear side surface panel 522 widens so as to roughly form a right angle (see FIG. 12C).

Thereafter, gas discharge from the inflator 6 is continued. However, the insertion passage 55 is closed so gas pressure inside the airbag cushion 5 increases even further, causing the insertion passage 55 to tighten even further. Therefore, gas leakage can be reliably prevented.

As described above, with the airbag device 4 according to the embodiment, the insertion passage 55 fulfills the role of a so-called check valve and can prevent gas leakage from inside the airbag cushion 5 to outside. Thus, there is no need to provide a separate metal fitting such as a steel band to prevent gas leakage. Therefore, the number of components can be reduced and manufacturing cost of the airbag device 4 can be lowered, and the process of crimping the metal fitting can be omitted, enabling an increase in productivity.

As described above, with the airbag device 4 according to the embodiment, the first piece 531 is integrally formed with the rear side surface panel 522; furthermore, the first piece 531 is integrally formed with the second piece 537, enabling reducing labor and increasing workability.

In the above, the case where the side surface panel 52 is configured using two parts, the front side surface panel 521 and rear side surface panel 522 was described as an example, but the present invention is not limited to this case and the side surface panel 52 can be configured from one panel. In other words, a single rectangular panel with a dimension in the longitudinal direction equal to the sum of the dimensions in the longitudinal direction of the front side surface panel 521 and the rear side surface panel 522 may be prepared and a cylindrical shape may be formed by sewing the edges of both short sides of this rectangular panel together.

In addition, in what is described above, the case where the first piece 531 is integrally formed with the rear side surface panel 522 and further the first piece 531 is integrally formed with the second piece 537 was described as an example, but the present invention is not limited to this case. A case where first piece 531 and the rear side surface panel 522 are respectively separate members and the first piece 531 and second piece 537 are respectively separate members is feasible, a case where the first piece 531 and the rear side surface panel 522 are respectively separate members and only the first piece 531 and second piece 537 are integrally formed is feasible, or a case where only the first piece 531 and the rear side surface panel 522 are integrally formed and the first piece 531 and second piece 537 are respectively separate members is feasible.

EXPLANATION OF CODES

1. Passenger compartment
2. Driver seat
3. Passenger seat
4. Airbag device
5. Airbag cushion
6. Inflator
50. Upper surface panel
51. Lower surface panel
52. Side surface panel
55. Insertion passage
56. Extension piece
60. Stud bolt
62. Gas discharge outlet
63. Main body part
521. Front side surface panel
522. Rear side surface panel
531. First piece
533. Through hole
534. Base part
535. Outer opening
536. First seam
537. Second piece
538. Folded part
539a, 539b, 539c. Second seam

The invention claimed is:

1. An airbag device, comprising:
an airbag cushion including at least two panels;
an inflator that discharges gas inside the airbag cushion;
a first piece having a base part extending from an edge of a first panel and a folded part that is folded inside the airbag cushion from the tip of the base part;
a second piece arranged opposite the folded part, connected to an edge of a second panel, and sewn to the folded part; and
an insertion passage for the inflator formed from the sewing of the folded part and the second piece extending from inside the airbag cushion towards the outside,
wherein the sewing of the folded part extends inside the airbag cushion towards the outside.

2. The airbag device according to claim 1, wherein the folded part and second piece are rectangular, a first seam sewing together the folded part and the second piece and second seams sewing together the first panel, the second panel, the first piece, and the second piece are formed, and the first seam and the second seam overlap.

3. The airbag device according to claim 1, wherein the insertion passage includes an internal opening that opens inside the airbag cushion and an outer opening that opens outside the airbag cushion, and the internal opening is smaller than the outer opening.

4. The airbag device according to claim 1, wherein the first piece is integrally formed with the first panel.

5. The airbag device according to claim 3, wherein the first piece and second piece are integrally formed with the first panel, the second piece is connected to the tip of the first piece, and the internal opening is formed at the boundary of the first piece and the second piece.

6. The airbag device according to claim 1, wherein the first piece and second piece are respectively separate members.

7. The airbag device according to claim 1, wherein the first panel is a side surface panel that forms a cylindrical shape in the case of expansion and deployment of the airbag cushion and the second panel is a bottom surface panel that blocks a first open end of the side surface panel.

8. The airbag device according to claim 7, wherein the first panel is composed of a plurality of parts.

9. The airbag device according to claim 3, wherein a gas discharge outlet of the inflator is arranged separated from the internal opening.

10. A method of manufacturing an airbag device provided with an airbag cushion including at least two panels and an inflator for blowing gas inside the airbag cushion, comprising:
overlapping a first piece extending from an edge of a first panel of the two panels with a second piece positioned at a distance from a base part of the first piece;
forming an insertion passage for the inflator along the extension direction of the first piece by sewing a first sewing at two isolated locations in a direction that intersects with this extension direction, which sews together the second piece and a portion of the first piece corresponding to the second piece;
folding a corresponding portion of the first piece so as to face the base part;
sewing a second sewing that sews together the first panel, the corresponding portion, the second piece, and a second panel; and
inserting the inflator through an outer opening of the insertion passage open to the outside of the airbag cushion into the airbag cushion,
wherein the sewing of the folded part extends inside the airbag cushion towards the outside.

11. The method for manufacturing an airbag device according to claim 10, wherein the first sewing is sewn so that the internal opening of the insertion passage that opens inside the airbag cushion is smaller than the outer opening.

12. The method for manufacturing the airbag device according to claim 11, wherein the second piece is connected to the tip of the first piece, the first piece and second piece are integrally formed, the internal opening is formed at the border of the first piece and the second piece, and the second piece is folded at the position of the internal opening so as to overlap with the first piece.

13. The method for manufacturing the airbag device according to claim 10, wherein the first piece and second piece are respectively separate members.

14. The method for manufacturing the airbag device according to claim 13, wherein the first panel is a side surface panel that forms a cylindrical shape in the case of expansion and deployment of the airbag cushion and the second panel is a bottom surface panel that blocks a first open end of the side surface panel.

15. The method for manufacturing an airbag device according to claim 14, wherein the first panel is formed from a plurality of parts.

* * * * *